US011751283B2

(12) United States Patent
Xu et al.

(10) Patent No.: US 11,751,283 B2
(45) Date of Patent: Sep. 5, 2023

(54) SYSTEM AND METHOD FOR SWITCHING MASTER AND SLAVE ROLES OF DEVICES FOR USE IN WIRELESS COMMUNICATIONS

(71) Applicants: WU QI TECHNOLOGIES, INC., Chongqing (CN); SHANGHAI WU QI TECHNOLOGIES, INC., Shanghai (CN)

(72) Inventors: Zhiyong Xu, Chongqing (CN); Guolong Wang, Chongqing (CN); Jianfeng Wang, Chongqing (CN)

(73) Assignees: WU QI TECHNOLOGIES, INC., Chongqing (CN); SHANGHAI WU QI TECHNOLOGIES, INC., Shanghai (CN)

( * ) Notice: Subject to any disclaimer, the term of this patent is extended or adjusted under 35 U.S.C. 154(b) by 175 days.

(21) Appl. No.: 17/435,736

(22) PCT Filed: Feb. 5, 2021

(86) PCT No.: PCT/CN2021/075553
§ 371 (c)(1),
(2) Date: Sep. 2, 2021

(87) PCT Pub. No.: WO2021/129892
PCT Pub. Date: Jul. 1, 2021

(65) Prior Publication Data
US 2022/0141918 A1 May 5, 2022

(30) Foreign Application Priority Data
Dec. 26, 2019 (CN) .................. 201911370402.X

(51) Int. Cl.
*H04W 84/20* (2009.01)
*H04W 76/14* (2018.01)
(Continued)

(52) U.S. Cl.
CPC ............. *H04W 84/20* (2013.01); *H04W 4/80* (2018.02); *H04W 52/0225* (2013.01); *H04W 76/14* (2018.02); *H04R 1/10* (2013.01)

(58) Field of Classification Search
CPC ... H04W 84/20; H04W 4/80; H04W 52/0225; H04W 76/14; H04W 52/0212; H04R 1/10; H04R 2420/07; Y02D 30/70
(Continued)

(56) References Cited

U.S. PATENT DOCUMENTS

2020/0252993 A1\* 8/2020 Srivastava ........ H04W 52/0274
2022/0159782 A1\* 5/2022 Ouyang ................ H04L 1/0061

FOREIGN PATENT DOCUMENTS

CN 108600897 A 9/2018
CN 109391876 A 2/2019
(Continued)

OTHER PUBLICATIONS

International Search Report issued in corresponding International Application No. PCT/CN20121/075553; dated Apr. 25, 2021; China National Intellectual Administration, Beijing, China, 5 pgs.
(Continued)

*Primary Examiner* — Eugene Yun
(74) *Attorney, Agent, or Firm* — HAUPTMAN HAM, LLP

(57) ABSTRACT

A system and method for switching master and slave roles of devices for use in wireless communications. The method includes: establishing a monitoring link for communications between a master device and a host device; and initiating a role exchange request, in which a time point for role exchange is appointed, by the master device or a slave device via the monitoring link when role switching between the master device and the slave device is triggered, and replying with a request receipt acknowledgment packet for
(Continued)

the receipt of the role exchange request by the other device via the monitoring link. The system includes the master device, the slave device, and the host device, wherein the master device includes a master processing module; and the slave device includes a slave processing module. The role exchange between the master device and the slave device keeps energy consumptions of the two devices evened out.

8 Claims, 2 Drawing Sheets

(51) Int. Cl.
*H04W 4/80* (2018.01)
*H04W 52/02* (2009.01)
*H04R 1/10* (2006.01)

(58) Field of Classification Search
USPC .......................................................... 455/41.2
See application file for complete search history.

(56) References Cited

FOREIGN PATENT DOCUMENTS

| | | |
|---|---|---|
| CN | 111132110 A | 5/2020 |
| WO | WO-9837669 A1 * | 8/1998 ............ H04W 74/02 |

OTHER PUBLICATIONS

Written Opinion issued in corresponding International Application No. PCT/CN20121/075553; dated Apr. 26, 2021; China National Intellectual Administration, Beijing, China, 6 pgs.

* cited by examiner

SYSTEM AND METHOD FOR SWITCHING MASTER AND SLAVE ROLES OF DEVICES FOR USE IN WIRELESS COMMUNICATIONS

RELATED APPLICATIONS

The present application is a U.S. National Phase of International Application Number PCT/CN2021/075553 filed Feb. 5, 2021 and claims priority to Chinese Application Number 201911370402.X filed Dec. 26, 2019.

TECHNICAL FIELD

The present invention relates to the field of Bluetooth headset communication technologies, and in particular, relates to a system and method for switching master and slave roles of devices for use in wireless communications.

BACKGROUND

Bluetooth headsets are typical products that are applied based on Bluetooth wireless communication technologies. The Bluetooth headsets enable voice or call data interaction without cables connected to host devices such as mobile phones or computers, and thus greatly facilitates users in using electronic devices for information interaction.

Dual wireless Bluetooth headsets include a master headset and a slave headset, both of which play music from a host device or make a call, synchronously. At present, there are three solutions for implementing communications between the two headsets of the dual wireless Bluetooth headsets. In a first solution, the host device only communicates with the master headset; a Bluetooth communication link is established between the master headset and the slave headset; and the master headset is responsible for forwarding music or call data from the host device to the slave headset. In a second solution, the host device establishes two A2DP links with the master headset and the slave headset, respectively; and the host device communicates with the master headset and the slave headset to perform data interaction, respectively. In a third solution, the master headset receives a data packet from the host device, and the slave headset acquires the data packet sent by the host device to the master headset in a monitoring manner.

During the actual use of the Bluetooth headsets, the two Bluetooth headsets have fixed roles, and always work according to preset roles. When a playing difference is present between the two headsets or a playback content is unclear, and when a sound from either of the headsets is lost, a user may stop using the headsets and lay them aside for charging or troubleshooting. The Bluetooth headset has short continuous use time, and requires frequent charging or troubleshooting, which leads to poor user experience.

SUMMARY

The present invention intends to provide a method for switching master and slave roles of devices for use in wireless communications, so as to solve the problem of use restrictions caused by fixed roles of the Bluetooth headsets during the use, and improve user experience.

In a solution, a method for switching master and slave roles of devices for use in wireless communications includes the following steps:

S100, establishing a monitoring link for communications between a master device and a host device; and S200, initiating a role exchange request, in which a time point for role exchange is appointed, by either of the master device and a slave device via the monitoring link when role switching between the master device and the slave device is triggered, and replying with a request receipt acknowledgment packet for the receipt of the role exchange request by the other device via the monitoring link.

This solution has the following beneficial effects. When the role switching of the master device or the slave device is triggered, it is difficult to accurately determine whether the reason for the unavailability of the Bluetooth headsets derives from a power problem. For example, the respective power consumptions of the master headset and the slave headset may be different when the master headset and the slave headset are used, it is actually measured with respect to a method for forwarding data by the master headset that the power consumption of the master headset is 20%-30% higher than that of the slave headset. In some scenarios, a power consumption difference between the master headset and the slave headset may be even greater than 40%. Moreover, in the case that the Bluetooth headsets are out of service, it is generally considered to be a problem of service suspension caused by a communication distance. If the master headset and the slave headset have fixed master and slave roles, when either one has large power consumption, the power consumption of said headset is fast, causing the Bluetooth headsets to lose sound at one side. When a power level of the slave headset is higher than that of the master headset due to the fast power consumption of the master headset in the Bluetooth headsets, the role switching of the master headset is triggered. Either the master device or the slave device sends the role exchange request via the monitoring link and appoints the time point for exchange in the role exchange request. For example, the master headset in the Bluetooth headsets sends the role exchange request to the slave headset and appoints to exchange the roles in a next communication time slot. The other device replies with the request receipt acknowledgment packet after receiving the role exchange request. For example, the slave headset sends the acknowledgment packet to the master headset after receiving the role exchange request. The role exchange between the master device and the slave device may keep the energy consumptions of the two devices evened out, thereby prolonging the service time of the devices and improving user experience.

Further, a trigger condition for the role switching is that a device with a high power level is switched to the master device when a power level difference between the master device and the slave device reaches a certain threshold.

A beneficial effect is as follows. The trigger condition is set based on the power level difference, and the device with a high power level is switched to the master device, such that the power levels of the two devices are more balanced; and the service time of the devices is prolonged by preventing either of the devices from becoming unavailable when the power of the other device is exhausted.

Further, after the appointed time point is reached and the switching is completed, the new master device receives a data packet from the host device and a request receipt acknowledgment packet from the new slave device; and the new slave device sends a switching completion acknowledgment packet to the new master device when the data packet sent by the host device to the new master device and the request receipt acknowledgment packet are received.

A beneficial effect is as follows. After the role switching is completed, data receiving or sending of the corresponding devices is also changed, such that the energy consumptions of the devices after the switching are also changed accordingly, and the energy consumption balance between the master device and the slave device is improved.

Further, the new master device restores to an initial slave role when the new master device does not receive the acknowledgment packet from the new slave device or the data packet within a preset number of times; and the new slave device restores to an initial master role when the new slave device does not receive the switching completion acknowledgment packet within a preset number of times.

A beneficial effect is as follows. By limiting a role switching time with a certain preset number of times, the failure of normal communication between the master device and the slave device can be prevented after the role switching fails, and the communication between the master device and the slave device is maintained.

Further, in Step S100, the slave device negotiates with the master device to enter a monitoring acknowledgment mode; in the monitoring acknowledgment mode, the master device or the slave device receives information sent by the host device, the master device subsequently continues to receive acknowledgment information sent by the slave device, and based on reception conditions of the two devices, the master device replies to the host device in a next communication time slot, and the monitoring acknowledgment mode is exited after the role switching is completed or fails.

Beneficial effects are as follows. Information interaction is carried out in the monitoring acknowledgment mode, and the monitoring acknowledgment mode is exited after the information interaction is completed. The data transmission in the communication time slot is based on a length of a data packet between the host device and the master device in the communication time slot, which is likely to add a few milliseconds of retransmission between the host device and the master device. These few milliseconds of retransmission will not affect the transmission of an ACL asynchronous link. A delay of these few milliseconds is equivalent to delaying the transmission of the data packet between the host device and the master device to the next communication time slot. When the host device and the master device undergo transmission with a synchronous link, the master device and the slave device may only interact using short data packets without affecting the synchronous link. The communication with respect to link management data between the master device and the slave device does not need to occupy a separate communication link all the time. Compared with an existing Bluetooth communication method, the power consumptions of the master device and the slave device can be reduced by cutting down one link.

Further, the role exchange request is sent in a long-packet interaction manner in the monitoring acknowledgment mode, and the acknowledgment packet is sent in a short-packet interaction manner.

A beneficial effect is as follows. The role exchange request is sent in a long-packet interaction manner, and the acknowledgment packet is sent in a short-packet interaction manner, such that the role exchange request can be distinguished from the acknowledgment information to prevent an error in role switching.

A system for switching master and slave roles of devices for use in wireless communications based on the method for switching the master and slave roles of the devices for use in the wireless communications includes a master device, a slave device, and a host device, wherein the master device includes a master processing module, and the slave device includes a slave processing module. A monitoring link is established between the slave processing module and the master processing module; when detecting a condition for triggering role switching, the master processing module or the slave processing module sends a role exchange request in which a time point for the role switching is appointed; and after acquiring the role exchange request, the master processing module or the slave processing module replies with a request receipt acknowledgment packet.

This solution has the following beneficial effects. The master processing module of the master device or the slave processing module of the slave device interact with respect to the role exchange request via the monitoring link. For example, when a master processor of the master headset in the Bluetooth headsets detects that a power level is less than that of the slave headset, the master processor of the master headset can send the role exchange request to a slave processor of the slave headset; and the slave processor feeds back an acknowledgment packet to the master processor after receiving the role exchange request. That is to say, the two devices of the Bluetooth headsets are exchanged in energy consumption speed, and are maintained balanced in energy consumption, thereby avoiding the problem of recharging either of the devices which runs out of power. As a result, the service time of the two devices is prolonged, and the user experience is improved.

Further, after the appointed time point is reached and the switching is completed, the new master processing module receives a data packet from the host device and a request receipt acknowledgment packet from the new slave processing module; the new slave processing module sends a switching completion acknowledgment packet to the new master device when the data packet and the request receipt acknowledgment packet are received; the new master processing module restores to an initial role when the new master processing module does not receive the acknowledgment packet from the new slave processing module or the data packet within a preset number of times; and the new slave processing module restores to an initial role when the new slave processing module does not receive the switching completion acknowledgment packet within a preset number of times.

A beneficial effect is as follows. After the role switching is completed, the functions of the master device and the slave device are exchanged accordingly. That is, the two devices are exchanged in energy consumption speed, thereby maintaining a balance in energy consumption between the master device and the slave device.

Further, the slave processing module negotiates with the master processing module to enter a monitoring acknowledgment mode; and the master processing module or the slave processing module sends the role exchange request in a long-packet interaction manner in the monitoring acknowledgment mode.

A beneficial effect is as follows. The role exchange request is sent in a long-packet interaction manner, such that the role exchange request can be distinguished from the acknowledgment packet, and more content such as the appointed time point can be transmitted at the same time.

Further, the slave processing module exits the monitoring acknowledgment mode after the role switching is completed or fails; and the slave processing module exits the monitoring acknowledgment mode by interaction based on a Bluetooth private communication protocol or by disconnecting a communication link.

A beneficial effect is as follows. The monitoring acknowledgment mode is exited after the information interaction of the role switching is completed, and the communication link will not be occupied all the time, thereby reducing the energy consumption of one link and saving more energy.

DETAILED DESCRIPTION

The following further provides detailed description with reference to specific embodiments.

Embodiment 1

Figure 2:
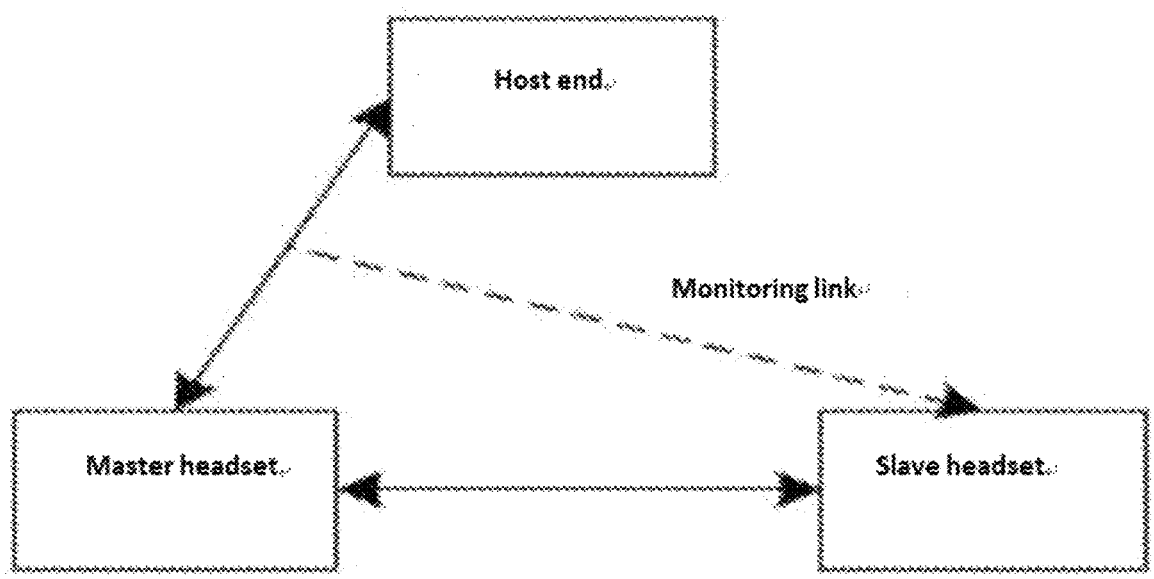
FIG. 2 is a schematic block diagram of a system for switching master and slave roles of devices for use in wireless communications according to an embodiment of the present invention.

As a shown in FIG. 2, A system for switching master and slave roles of devices for use in wireless communications includes a master device, a slave device, and a host device. Taking Bluetooth headsets as an example, the master device receives a data packet of the host device. For example, the host device may be a mobile phone or a computer, and the data packet is voice information or call information. The master device includes a master processing module; a master headset is a master headset of the Bluetooth headsets; and the master processing module is a master processor inside the master headset. The slave device includes a slave processing module; a slave headset is a slave headset of the Bluetooth headsets; and the slave processing module is a slave processor inside the slave headset. Power supplies, microphones and the like in the master and slave devices are based on existing designs, which will not be repeated here anymore. The slave processing module establishes a monitoring link for communications between the master processing module and the host device. When detecting a condition for triggering role switching, the master processing module or the slave processing model sends a role exchange request in which a time pint for the role exchange is appointed. The master processing module or the slave processing module replies with a request acknowledgment packet after acquiring the role exchange request.

Figure 1:
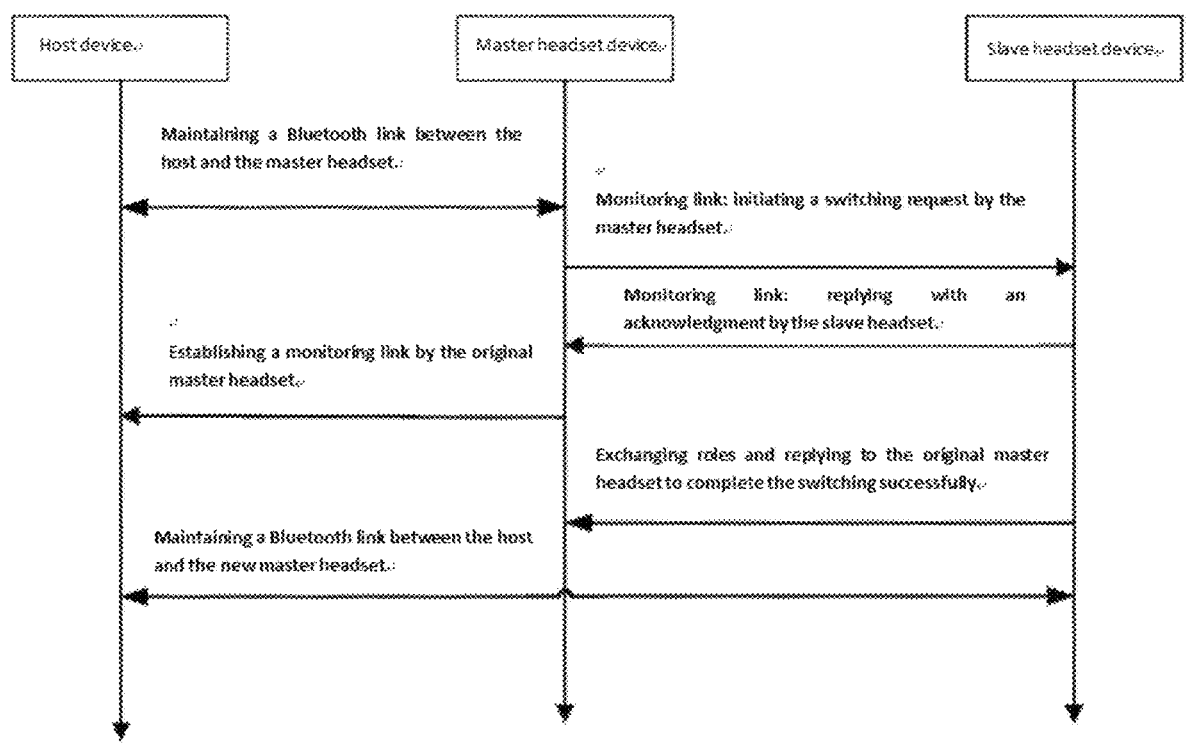
FIG. 1 is a schematic diagram of a method for switching master and slave roles of devices for use in wireless communications according to an embodiment of the present invention.

As shown in FIG. 1, a method for switching master and slave roles of devices for use in wireless communications with respect to the system for switching the master and slave roles of the devices for use in the wireless communications includes the following steps.

In S100, at an initial stage, a master device communicates with a slave device; the master device receives a data packet from a host device for communication; and the slave device establishes a monitoring link for the communications between the master device and the host device, that is, the slave headset establishes a monitoring link for communications between the master headset and the host device. A communication link established between the master device and the host device through the master processing module is defined as a Bluetooth link 1, that is, a communication link between the master headset and the mobile phone is the Bluetooth link 1. A communication link established between the master device and the slave processing module of the slave device through the master processing module is defined as a Bluetooth link 2. The master device sends a data packet of the Bluetooth link 1 to the slave device via the Bluetooth link 2, that is, the master headset sends the data packet received from the mobile phone to the slave headset. The slave device negotiates with the master device to enter a monitoring acknowledgment mode, that is, the slave headset negotiates with the master headset to enter the monitoring acknowledgment mode. In the monitoring acknowledgment mode, the master device or the slave device receives information sent by the host device; the master device subsequently continues receiving acknowledgment information sent by the slave device; and based on the reception conditions of the two devices, the master device replies to the host device in a next communication time slot.

In S200, when the role switching between the master device and the slave device is triggered, for example, when a power level difference between the master device and the slave device reaches a certain threshold (that is, when a power level of the master headset is lower than that of the slave headset), the device with a high power level is switched to the master device. Either the master device or the slave device initiates a role exchange request via the monitoring acknowledgment mode of the monitoring link, where the role exchange request is carried out in a long-packet interaction manner, and the long packet interaction may include link management information such as the role exchange request, a Bluetooth address, and clock information. For example, the master headset as the master device sends the role exchange request to the slave headset as the slave device, and appoints a time point for the role exchange in the role exchange request. For example, it is appointed in the role exchange request that the roles are exchanged in a next communication time slot. The other device replies with a request receipt acknowledgment packet for the receipt of the role exchange request via the monitoring link. For example, the slave headset receiving the role exchange request replies with the acknowledgment packet to the master headset, where the acknowledgment packet is carried in a short-packet interaction manner, such as acknowledgment information (ACK) as a short packet.

After the role exchange is completed, the new master device (i.e., the original slave device) receives the data packet of the host device and the request receipt acknowledgment packet of the new slave device (i.e., the original master device); and the new slave device (i.e., the original master device) sends an exchange completion acknowledgment packet to the new master device (i.e., the original slave device) when receiving the data packet and the request receipt acknowledgment packet. That is, the new master headset receives the data packet from the mobile phone and the acknowledgment packet from the new slave headset, and the new slave headset replies with the acknowledgment packet to the new master headset when receiving the data packet and the request acknowledgment packet.

After the role exchange request is initiated, the new master device restores to an initial slave role when it does not receive the acknowledgment packet from the new slave device or the data packet within a preset number of times. For example, when the new master headset (i.e., the original slave headset) cannot receive the data packet from the mobile phone or the acknowledgment packet from the new slave headset (i.e., the original master headset), the new master headset restores to the slave headset with initial functions. The new slave device restores to the initial master role when the new slave device does not receive the switch completion acknowledgment packet within a preset number of times. For example, when the new slave headset (i.e., the original master headset) cannot receive the data packet from the new master headset (i.e., the original slave headset) or the acknowledgment packet from the new master headset (i.e., the original slave headset), the new slave headset restores to the master headset with initial functions. After the role switching is completed or fails, the master processing module and the slave processing module exits the monitoring acknowledgment mode in an information interaction manner.

In Embodiment 1, when the power levels of the master headset and the slave headset are different, the master headset is triggered to send a role exchange request. After the roles of the master headset and the slave headset are exchanged, the two can be mutually changed in energy consumption speed, which can keep the energy consumptions of the master headset and the slave headset evened out, thereby increasing the service time of the devices. Moreover, the role exchange request is sent in the long-packet interaction manner in the monitoring acknowledgment mode of the monitoring link, and the monitoring acknowledgment mode is exited after the role switching is completed or fails, such that the communication of link management data between the master headset and the slave headset does not need to occupy a separate communication link all the time. Compared with the existing Bluetooth communication method, the power consumptions of the master device and the slave device can be reduced by cutting down one link.

Embodiment 2

Compared with Embodiment 1, a difference lies in that: when the master headset is poor in communication quality and acts as the master headset to receive data packets all the time, it may easily lead to a decrease of the overall communication quality of the Bluetooth headsets or even lead to communication interruption. Therefore, when the master processing module of the master headset detects that the communication quality is lower than that of the slave headset, the communication quality is characterized by the strength of received signals and the success rate of packet receiving. The master headset sends a role exchange request to the slave headset through the monitoring link. A slave processing module of the slave headset replies with an acknowledgment packet to the master headset in the monitoring link after acquiring the role exchange request. Then, the master processing module of the master headset is switched in role and establishes a monitoring link. The slave processing module of the slave headset then replies a switch success acknowledgment packet to the master headset. After the roles are switched successfully, the new master headset (i.e., the initial slave headset) and the host device performs transmission with respect to voice data packets. In Embodiment 2, the master and slave roles of the headsets are exchanged when the communication quality is low, so as to prevent the problem of poor data transmission caused by the fact that the switching is not performed when the communication quality is low.

The description above merely provides the embodiments of the present invention, and the specific structure, characteristics and other common knowledge known in the solutions are not described too much herein. It should be noted that a number of variations and improvements can be made by a person of ordinary skills in the art without departing from the structure provided by the present invention, and these shall be construed as falling within the protection scope of the present invention, and will not affect the implementation effect and the patent applicability of the present invention. The protection scope of the present invention shall be subject to the protection scope defined by the claims. The specific embodiments and others stated in the specifications can be used to interpret the claims.

What is claimed is:

1. A method for switching master and slave roles of devices for use in wireless communications, comprising the following steps:
    S100, establishing a monitoring link for communications between a master device and a host device;
    S200, initiating a role exchange request, in which a time point for role exchange is appointed, by either of the master device and a slave device via the monitoring link when role switching between the master device and the slave device is triggered, and replying with a request receipt acknowledgment packet for the receipt of the role exchange request by the other device via the monitoring link; and
    wherein the new master device restores to an initial slave role when the new master device fails to receive the acknowledgment packet from the new slave device or the data packet within a preset number of times; and the new slave device restores to an initial master role when the new slave device fails to receive the switching completion acknowledgment packet within a preset number of times.

2. The method for switching the master and slave roles of the devices for use in the wireless communications according to claim 1, wherein a trigger condition for the role switching is that a device with a high power level is switched to the master device when a power level difference between the master device and the slave device reaches a certain threshold.

3. The method for switching the master and slave roles of the devices for use in the wireless communications according to claim 1, wherein after the appointed time point is reached and the switching is completed, the new master device receives a data packet from the host device and a request receipt acknowledgment packet from the new slave device; and the new slave device sends a switching completion acknowledgment packet to the new master device when the data packet sent by the host device to the new master device and the request receipt acknowledgment packet are received.

4. The method for switching the master and slave roles of the devices for use in the wireless communications according to claim 1, wherein in Step S100, the slave device negotiates with the master device to enter a monitoring acknowledgment mode; in the monitoring acknowledgment mode, the master device or the slave device receives information sent by the host device, the master device subsequently continues to receive acknowledgment information sent by the slave device, and based on reception conditions of the two devices, the master device replies to the host device in a next communication time slot; and the monitoring acknowledgment mode is exited after the role switching is completed or fails.

5. The method for switching the master and slave roles of the devices for use in the wireless communications according to claim 4, wherein the role exchange request is sent in a long-packet interaction manner in the monitoring acknowledgment mode, and the acknowledgment packet is sent in a short-packet interaction manner.

6. A system for switching master and slave roles of devices for use in wireless communications, comprising a master device, a slave device, and a host device, wherein the master device comprises a master processing module, and the slave device comprises a slave processing module;

wherein a monitoring link is established between the slave processing module and the master processing module; when detecting a condition for triggering role switching, the master processing module or the slave processing module sends a role exchange request in which a time point for role exchange is appointed; and after acquiring the role exchange request, the master processing module or the slave processing module replies with a request receipt acknowledgment packet; and wherein after the appointed time point is reached and the switching is completed, the new master processing module receives a data packet from the host device and a request receipt acknowledgment packet from the new slave processing module; the new slave processing module sends a switching completion acknowledgment packet to the new master device when the data packet and the request receipt acknowledgment packet are received; the new master processing module restores to an initial role when the new master processing module fails to receive the acknowledgment packet from the new slave processing module or the data packet within a preset number of times; and the new slave processing module restores to an initial role when the new slave processing module fails to receive the switching completion acknowledgment packet within a preset number of times.

7. The system for switching the master and slave roles of the devices for use in the wireless communications according to claim 6, wherein the slave processing module negotiates with the master processing module to enter a monitoring acknowledgment mode; and the master processing module or the slave processing module sends the role exchange request in a long-packet interaction manner in the monitoring acknowledgment mode.

8. The system for switching the master and slave roles of the devices for use in the wireless communications according to claim 7, wherein the slave processing module exits the monitoring acknowledgment mode after the role switching is completed or fails; and the slave processing module exits the monitoring acknowledgment mode by interaction based on a Bluetooth private communication protocol or by disconnecting a communication link.

\* \* \* \* \*